United States Patent
Lego et al.

(10) Patent No.: US 12,504,164 B2
(45) Date of Patent: Dec. 23, 2025

(54) OPERATING A DOMESTIC STEAM-TREATMENT APPLIANCE, AND DOMESTIC STEAM-TREATMENT APPLIANCE

(71) Applicant: BSH Hausgeräte GmbH, Munich (DE)

(72) Inventors: Dieter Lego, Karlsruhe (DE); Martin Nagel, Forstheim (DE); Gilles Patrick Tiodong Nongni, Karlsruhe (DE); Benjamin Wagner, Bretten (DE)

(73) Assignee: BSH Hausgeräte GmbH, Munich (DE)

( * ) Notice: Subject to any disclaimer, the term of this patent is extended or adjusted under 35 U.S.C. 154(b) by 514 days.

(21) Appl. No.: 18/007,760

(22) PCT Filed: Jul. 7, 2021

(86) PCT No.: PCT/EP2021/068853
§ 371 (c)(1),
(2) Date: Dec. 2, 2022

(87) PCT Pub. No.: WO2022/017799
PCT Pub. Date: Jan. 27, 2022

(65) Prior Publication Data
US 2023/0272905 A1    Aug. 31, 2023

(30) Foreign Application Priority Data
Jul. 22, 2020   (DE) .......... 102020209225.7

(51) Int. Cl.
*F22D 5/26*    (2006.01)
*A47J 27/04*   (2006.01)
(Continued)

(52) U.S. Cl.
CPC ............ *F22D 5/26* (2013.01); *A47J 27/04* (2013.01); *F22B 1/284* (2013.01); *F22B 37/78* (2013.01);
(Continued)

(58) Field of Classification Search
CPC ..................................... G01F 23/243
See application file for complete search history.

(56) References Cited

U.S. PATENT DOCUMENTS 4,107,511 A * 8/1978 Shulz ............... A47J 27/16
219/401
4,382,173 A * 5/1983 Howard-Leicester ......
B01D 1/0082
392/326

(Continued)

FOREIGN PATENT DOCUMENTS

DE   102017101078 A1   7/2018
EP       1430823 A1    6/2004
WO    2009007456 A2    1/2009

OTHER PUBLICATIONS

National Search Report DE 10 2020 209 225.7 dated Mar. 16, 2021.
International Search Report PCT/EP2021/068853 dated Nov. 30, 2021.

*Primary Examiner* — Ko-Wei Lin
(74) *Attorney, Agent, or Firm* — Michael E. Tschupp; Andre Pallapies; Brandon G. Braun

(57) ABSTRACT

In a method for operating a household steam treatment appliance which includes an evaporator with a heatable water holding chamber and a fill level sensor with at least two measurement electrodes, which are disposed over one another at a distance from each other in the heatable water holding chamber, a water detection measured value provided for indicating wetting of the at least two measurement electrodes with water introduced into the water holding chamber is adapted in an adaptation process to an electrical conductivity of the water in the water holding chamber.

15 Claims, 2 Drawing Sheets

(51) Int. Cl.
F22B 1/28 (2006.01)
F22B 37/78 (2006.01)
G01F 23/24 (2006.01)

(52) U.S. Cl.
CPC ....... *G01F 23/243* (2013.01); *A47J 2027/043* (2013.01); *A47J 2203/00* (2013.01)

(56) References Cited

U.S. PATENT DOCUMENTS

| | | | | |
|---|---|---|---|---|
| 5,623,574 | A | * | 4/1997 | Knepler ................. A47J 31/56 99/280 |
| 2015/0308877 | A1 | * | 10/2015 | Faraldi ................. G01F 23/243 73/304 R |
| 2021/0063227 | A1 | | 3/2021 | Krieger |

* cited by examiner

OPERATING A DOMESTIC STEAM-TREATMENT APPLIANCE, AND DOMESTIC STEAM-TREATMENT APPLIANCE

CROSS-REFERENCES TO RELATED APPLICATIONS

This application is the U.S. National Stage of International Application No. PCT/EP2021/068853, filed Jul. 7, 2021, which designated the United States and has been published as International Publication No. WO 2022/017799 A1 and which claims the priority of German Patent Application, Serial No. 10 2020 209 225.7, filed Jul. 22, 2020, pursuant to 35 U.S.C. 119 (a)-(d).

The contents of International Application No. PCT/EP2021/068853 and German Patent Application, Serial No. 10 2020 209 225.7 are incorporated herein by reference in their entireties as if fully set forth herein.

BACKGROUND OF THE INVENTION

The invention relates to a method for operating a household steam treatment appliance, having an evaporator with a heatable water holding chamber and a fill level sensor with two measurement electrodes which are disposed one over the other at a distance from each other in the water holding chamber, wherein a water detection measured value is provided for indicating wetting of both measurement electrodes with water introduced into the water holding chamber. The invention also relates to a corresponding household steam treatment appliance with a control device, wherein the household steam treatment appliance is embodied to carry out the method, in particular using the control device. The invention can be applied particularly advantageously to steam cooking appliances, in particular to baking ovens and/or microwave appliances having a steam treatment function.

Fill level sensors or fill level measurement apparatuses of the type concerned typically have a top measurement electrode and a bottom measurement electrode, wherein the bottom measurement electrode comes into contact with water introduced sooner than the top measurement electrode. The bottom measurement electrode can be arranged in the bottom in the water holding chamber (e.g., can also constitute a region of the bottom), while the top measurement electrode is disposed higher than this on a side wall of the water holding chamber or protrudes from the top into the water holding chamber. It is also possible for both measurement electrodes to protrude from the top into the water holding chamber, wherein the bottom measurement electrode protrudes further than the top measurement electrode, and so on.

For fill level measurement an electrical voltage is applied to both measurement electrodes and the electrical current flowing between the measurement electrodes is measured. Since fluid generally has a considerably lower specific electrical resistance or a higher electrical conductivity than air, through an increase in the measured values of the fill level sensor above a predetermined threshold (referred to in the following as 'water detection measured value') it is possible to detect whether the fill level of the water in the water holding chamber has reached the top measurement electrode and made contact with it. The water detection measured value therefore corresponds to a sensitivity level for detecting that the top measurement electrode has been reached: if the measured value measured by the fill level sensor is below the water detection measured value, it is assumed that the water does not reach the top measurement electrode. The water detection measured value is therefore provided because leakage currents flowing between the two measurement electrodes but not directly through the water introduced may also occur which would then wrongly simulate a water holding chamber filled with water to the top measurement electrode. Such leakage currents can, for example, flow through damp inner walls of the evaporator, particularly if these are covered in a porous layer of limescale, in which water can collect.

DE 10 2014 203 537 A1 discloses an evaporator for a steam treatment appliance, in particular a household appliance, having a receiving chamber for fluid to be evaporated with surface heating at the bottom and a steam vent and two exposed electrical contacts in the receiving chamber for determining a fill level in the receiving chamber, wherein the surface heating has at least one unheated zone and at least one electrical contact is disposed above an unheated zone. A steam treatment appliance, in particular a steam cooking appliance, has at least one such evaporator.

WO 2009/007456 A3 discloses an apparatus for adding water for the purpose of generating steam in a cooking appliance, having an evaporator vessel, into which water can be fed as a function of the fill level of the water contained in the evaporator vessel, and electrodes with which the fill level of the water in the evaporator vessel can be detected, wherein an inner wall of the evaporator vessel is formed at least partly from an electrically conductive material and this part of the inner wall is a first electrode.

However, it has been shown that an operation of an evaporator of a household steam treatment appliance may not proceed satisfactorily as a function of the type of water introduced.

BRIEF SUMMARY OF THE INVENTION

The object of the present invention is to overcome the disadvantages of the prior art at least partially and in particular to provide an improved possibility of operating an evaporator of a household steam treatment appliance using various types of water (e.g. tap water, distilled water, and so on).

This object is achieved according to the features of the independent claims. Advantageous embodiments are the subject matter of the dependent claims, the description, and the drawings.

The object is achieved by a method for operating a household steam treatment appliance, having an evaporator with a heatable water holding chamber and a fill level sensor with two measurement electrodes which are disposed one over the other at a distance from each other in the water holding chamber, wherein a water detection measured value provided for indicating wetting of both measurement electrodes with water introduced into the water holding chamber, is adapted to an electrical conductivity of the water present in the water holding chamber.

The advantage of this is that the reaching of a particular fill level of the water in the water holding chamber, determined by the direct electrical connection between the two measurement electrodes through the water introduced, can be reliably detected for a wide range of electrical conductivity of the water. Thus, the evaporator can be correctly operated even when the water is very soft (e.g. has a conductivity of less than 50 µS/cm). Examples of such very soft water can be distilled water, osmosis water, or deionized water (purified water). The method can also be advantageously implemented in an inexpensive way since preexisting components of known evaporators with the respective design can still be used without alteration and a software adaptation is easy to implement. By way of example, the evaporator can have the design described in DE 102014203537 A1, the content of which is fully incorporated.

The method is based on the knowledge that sometimes an unsatisfactory operation of an evaporator is caused by water being used that has a considerably lower electrical conductivity than water with a usually accepted conductivity (standard conductivity, e.g. drinking water from a water pipe). This standard conductivity can, e.g. be set or selected ex-works, by a repair service or by a user. This is because with a considerably lower conductivity of the water than the accepted standard conductivity there may be occasions when the (current) measured value determined by the fill level sensor is actually lower than the water detection measured value based on the standard conductivity if the water introduced comes into contact with both measurement electrodes. The situation may then arise in which the household steam treatment appliance incorrectly fails to detect an insufficient fill level in the water holding chamber. Consequently, the household steam treatment appliance will not operate the evaporator correctly. This problem is avoided by adapting the water detection measured value to the electrical conductivity of the water introduced.

The steam treatment appliance can be a steam cooking appliance. The steam cooking appliance can be a standalone appliance or a combination appliance, e.g. a baking oven and/or a microwave oven with a steam treatment function.

The evaporator can be an evaporator disposed outside of a treatment chamber to which medium to be evaporated is fed. However, it can also be disposed inside the treatment chamber, for example mounted in a side wall.

The treatment chamber can be a cooking chamber for treating food to be cooked. In the case of an oven, the cooking chamber can also be referred to as the cooking chamber. By activating a heater associated with the evaporator (e.g. with an output of up to 1200 W) the water present in the water holding chamber can be heated, particularly to boiling point. The evaporated water can be passed via a steam feed into the treatment chamber. For temperature setting or regulation, a temperature sensor for determining a temperature of the water in the water holding chamber can be associated with the evaporator.

During steam generation operation (e.g. for steam cooking) the evaporator can for example be operated in such a way that if the measured value determined or measured by the fill level sensor is below the water detection measured value, water in the water holding chamber is topped up, until the water detection measured value is reached again or exceeded, if necessary together with a particular additional volume, which results e.g. from a delayed switching off of a pump.

The water holding chamber of the evaporator can advantageously be filled with water from a water tank that can be disposed in the household steam treatment appliance. The filling can e.g. be carried out by activating a pump or by opening a valve with subsequent gravitational flowing of the water from the tank. The water tank can be removable or permanently installed in the appliance. In one variant, the water tank is fillable by a user particularly if it is removable. In another variant, particularly advantageous for non-removable water tanks, the water tank can be automatically refillable, e.g. via a mains water connection. The capacity of the water tank is typically many times greater than the capacity of the water holding chamber.

The fill level sensor is particularly connected to a control device of the household steam treatment appliance, via which filling of the water holding chamber can also be controlled. The measurement signal captured by the fill level sensor can be or be made digital and then be present as a (digital) measured value in corresponding units or digits. The measured value correlates with the current flowing between the measurement electrodes, particularly proportionally. For example, the measured values can be configured such that one unit corresponds to approximately 1 mA.

The fact that the water detection measured value is adapted to an electrical conductivity of the water present in the water holding chamber means that this can be carried out without user intervention, or automatically.

The electrical conductivity of very soft water (e.g. completely de-mineralized water, osmosis water, deionized water, distilled water, and so on) is often between 1 µS/cm and 100 µS/cm, and for normal drinking water according to the Drinking Water Ordinance within the overall hardness range of between 100 µS/cm and 2500 µS/cm (dependent on temperature). Particularly, if the electrical conductivity is lower than 50 µS/cm, when the water detection measured value is set to drinking water according to the Drinking Water Ordinance, problems can arise with the operation of the evaporator, since it may not be possible to reliably detect contact with both measurement electrodes by the water introduced.

If, for example, for use with water according to the Drinking Water Ordinance, the water detection measured value is set at 450 measuring units or digits (e.g. according to a particular electrical current), leakage currents via water paths other than the water introduced (e.g. through damp inner walls) can be reliably excluded, since in practice the leakage currents do not reach 450 measuring units. If the water holding chamber is now filled not with the water according to the Drinking Water Ordinance but with very soft water with an electrical conductivity of e.g. lower than 50 µS/cm (e.g. because a user has filled the water tank with distilled water, without adapting the default settings), there may be occasions when the current flow between the two measurement electrodes, even when immersed in the water introduced, does not reach the predefined water detection measured value of 450 measuring units. The appliance logic then considers that the water has not yet reached the associated fill level, although in fact it has.

One embodiment is that during an adaptation process for adapting the water detection measured value to the electrical conductivity of the water present in the water holding chamber (a) the water detection measured value is set at a predetermined minimum value;
(b) the water holding chamber is filled with water until the minimum value is reached or exceeded;
(c) the water in the water holding chamber is brought to boiling point;
(d) by means of the fill level sensor at least one associated measured value is determined;
(e) the water detection measured value is adapted using the at least one measured value determined in step (d).

The advantage of this approach is that it reliably results in a water detection measured value which can be adapted to wide ranges of conductivity and which is able to manage without precise calculation of the electrical conductivity of the water and without knowledge of the electrical conductivity.

The adaptation process can be carried out automatically. It can be independently triggered by the appliance, by a user, or by a service engineer.

The minimum value set in step (a) is dimensioned such that, particularly assuming no or only very low leakage currents, the wetting of both measurement electrodes in step (b) is also detected for very soft water (e.g. with a conductivity of between 1 µS/cm and 100 µS/cm, particularly between 1 µS/cm and 50 µS/cm). The water introduced is typically cold water, e.g. with a temperature of around room temperature (25° C.) or less. The minimum value is particularly higher than zero, e.g. 40 measuring units or digits.

The minimum value can be sufficiently low that during a steam generation operation, typically occurring leakage currents generate higher measured values. One embodiment is therefore that step (b) is carried out with a dry evaporator. This can e.g. be the case, if the evaporator has not been operated for a sufficiently long period of time (e.g. at least one day).

By heating the water in step (c) to at least approximately boiling point (e.g. to a temperature of between 95° C. and 100° C.) it is advantageously ensured that the electrical conductivity of the water lies in the same temperature range as during a normal steam generation operation. This is based on the consideration that the electrical conductivity of water is highly temperature-dependent. Thus it typically increases by approximately 2% per 1° C. increase in temperature. The boiling temperature can advantageously be reached particularly reliably, by contrast with lower temperatures, even without using a temperature sensor. By way of example the water can be time-controlled (e.g. for 45 s) or temperature-controlled (e.g. when a temperature sensor is present). However, generally, another increased temperature other than the boiling temperature can also be set, particularly if this is adjustable.

The fact that in step (d) at least one associated measured value is determined means that one or more measured values are recorded with hot water. One development is that a measured value is determined or calculated, particularly as an average value, using a range of individual measured values recorded within a particular measurement period (e.g. between five and ten seconds). This results in the advantage that the measured value can be determined particularly reliably, since fluctuations in the individual measured values, e.g. caused by a movement of the surface, are suppressed.

The measured value determined in step (d) can correspond to an actual fill level which, particularly with very soft water, is considerably higher than the position of the bottom end (height) of the top measurement electrode. The higher the conductivity of the water, the better the measured value corresponds with the height of the top measurement electrode.

The adaptation in step (e) means that a check is carried out to determine which measured value determined in step (d) is a suitable water detection measured value. If the water detection measured value determined in this way does not correspond to the minimum value, the water detection measured value determined is set or adopted as the new water detection measured value. The water detection measured value is advantageously lower than the measured value determined in step (d).

One embodiment is that in step (e) the water detection measured value is adapted via a formula or a characteristic curve, which provides a link between the measured value determined in step (d) and the water detection measured value. Thus, the water detection measured value can be set to a particularly fine degree with the measured value as an input variable. The formula, its parameters, and the characteristic curve (or table) data can be determined experimentally in advance, e.g. by a manufacturer of the household steam treatment appliance. The formula can for example represent a predetermined difference from the measured value determined in step (d) or a predetermined fraction of the measured value determined in step (d).

One embodiment is that in step (e) the water detection measured value is fixed at a first, higher value, if the measured value determined in step (d) exceeds a predetermined threshold, or otherwise at a second, lower value. A check is therefore carried out to determine whether after detecting water in the water holding chamber the associated measured value is rather low (below the predetermined threshold, e.g. if very soft water has been introduced) or rather high (above the predetermined threshold, e.g. if water according to the Drinking Water Ordinance has been introduced). Depending on this, the water detection measured value is set to a lower value (e.g. suitable for very soft water) or to a higher value (e.g. suitable for water according to the Drinking Water Ordinance). These two water detection measured values can be fixedly predetermined. However, it is in principle also possible, instead of these two categories or values, to use more than two categories, e.g. by using two thresholds with and a corresponding setting of a low, a medium, and a high water detection measured value, and so on. This at least one threshold can also be referred to as 'hardness limit'.

One embodiment is that after step (d) and before step (e) the following steps are carried out:
- (d2) water is removed from the water holding chamber, until by means of the fill level sensor a predetermined fraction A of the measured value determined in step (d) is fallen below;
- (d3) then by means of the fill level sensor an associated further measured value is determined;

and the water detection measured value is set in step (e) to a value between the measured value measured in step (d) and the further measured value measured in step (d3). The advantage is thus achieved that the water detection measured value can also be calculated without a characteristic curve or complex formula. The measured value determined in step (d) can also be referred to as 'upper measured value' and the further measured value determined in step (d3) also as 'lower measured value'. This embodiment makes use of the fact that the measured value measured by the fill level sensor upon removal (e.g. pumping out or draining) of the water from the water holding chamber, drops comparatively suddenly, if the electrodes are no longer in electrical contact through the water. The fraction A is in principle arbitrary but is advantageously dimensioned such that the lower measured value typically reflects a situation in which the two measurement electrodes are reliably no longer in electrical contact through the water introduced, but a larger volume of water is still present in the water holding chamber. The lower measured value therefore reflects at least approximately the leakage current present during steam generation operation. The lower measured value or the leakage current can be considerably below the upper measured value multiplied by the fraction A.

The predetermined factor or fraction A is advantageously in a range [0.1; 0.5], particularly [0.1; 0.3], particularly [0.25; 0.15], e.g. approximately 0.2.

In step (d2) the associated lower measured value can be determined similarly to the upper measured value, e.g. as the average value of a measurement sequence recorded over a predetermined period of time (e.g. between five and ten seconds).

The water detection measured value x_thr can be set in step (e) for example to a value $$x\_thr=(x\_o-x\_u)*B+x\_u$$

or $$x\_thr=x\_o-(x\_o-x\_u)*B,$$

wherein x_o represents the upper measured value, x_u the lower measured value, and B a suitable arbitrary factor, particularly from the value range]0; 1[. Values of B from the value range [0.4; 0.6], especially 0.5, have proven to be particularly suitable.

Using the lower measured value (or an arbitrary other measured value, which practically only measures a leakage current) a conclusion can also be drawn on the degree of contamination, in particular the degree of limescale: the higher the measured value associated with the leakage current, the greater the tendency also to contamination, in particular limescale build-up in the evaporator. One development is that at least one action relating to descaling is triggered, if the measured value associated with a leakage current exceeds a predetermined threshold. The action can comprise e.g. an output to a user to start a descaling process, and/or automatic performance of a descaling process. The threshold (which can also be referred to as the 'limescale build-up detection threshold') can e.g. be fixedly predetermined or determined on the basis of a corresponding value determined after a descaling process, for example as a fixed or percentage difference in value compared to a value determined after a descaling process. However, the limescale detection threshold can also be determined otherwise from historical data.

The method described above is advantageously carried out at a time when the evaporator is not yet or no longer contaminated, in particular covered in limescale. (New condition or following a descaling process with sufficient rinsing). The method can be repeated if particular events occur, e.g. after a change in water hardness, after a pump timeout, initiated by a repair service, in a time-controlled manner (e.g. every three months) and/or after restoring factory settings. Thus e.g. the pump timeout constitutes a fault, which indicates that the pump is running for too long in order to fill the water holding chamber with water. This can occur for example if, without adaptation of the water detection measured value, very soft water is introduced into the water holding chamber: the water is then namely not detected, or not to a sufficient extent, and the pump remains active, although the electrodes have already been wetted by it.

One embodiment is that if the measured value determined in step (d) exceeds a predetermined threshold, the presence of a descaling agent is established. Here use is made of the fact that the descaling agent noticeably increases the electrical conductivity. It is concluded that a measured value above the threshold (which can also be referred to as the 'descaling threshold') has probably been caused by the presence of descaling agent in the water. The descaling threshold can be e.g. 2000 µS/cm or higher, since in the presence of a descaling agent the electrical conductivity is typically in a range between 2,000 µS/cm and 50,000 µS/cm.

One embodiment is that the predetermined (descaling) threshold is determined during a separate descaling process and then, if the presence of descaling agent is identified, at least one rinsing operation is carried out in order to rinse the water holding chamber, particularly with clean water (without descaling agent).

The object is furthermore achieved by a household steam treatment appliance having an evaporator with a heatable water holding chamber and a fill level sensor having at least two measurement electrodes, which are disposed one over the other at a distance from each other in the water holding chamber, wherein the control device is embodied to carry out the method as described above. The household steam treatment appliance can be embodied similarly to the method and vice versa and has the same advantages.

One embodiment is therefore that the household steam treatment appliance is a steam cooking appliance.

BRIEF DESCRIPTION OF THE DRAWINGS

The characteristics, features and advantages of this invention as described above and the way these advantages are achieved are described more clearly and understandably by reference to the following schematic description of an exemplary embodiment, which is further explained by reference to the drawings.

DETAILED DESCRIPTION OF EXEMPLARY EMBODIMENTS OF THE PRESENT INVENTION

Figure 1:
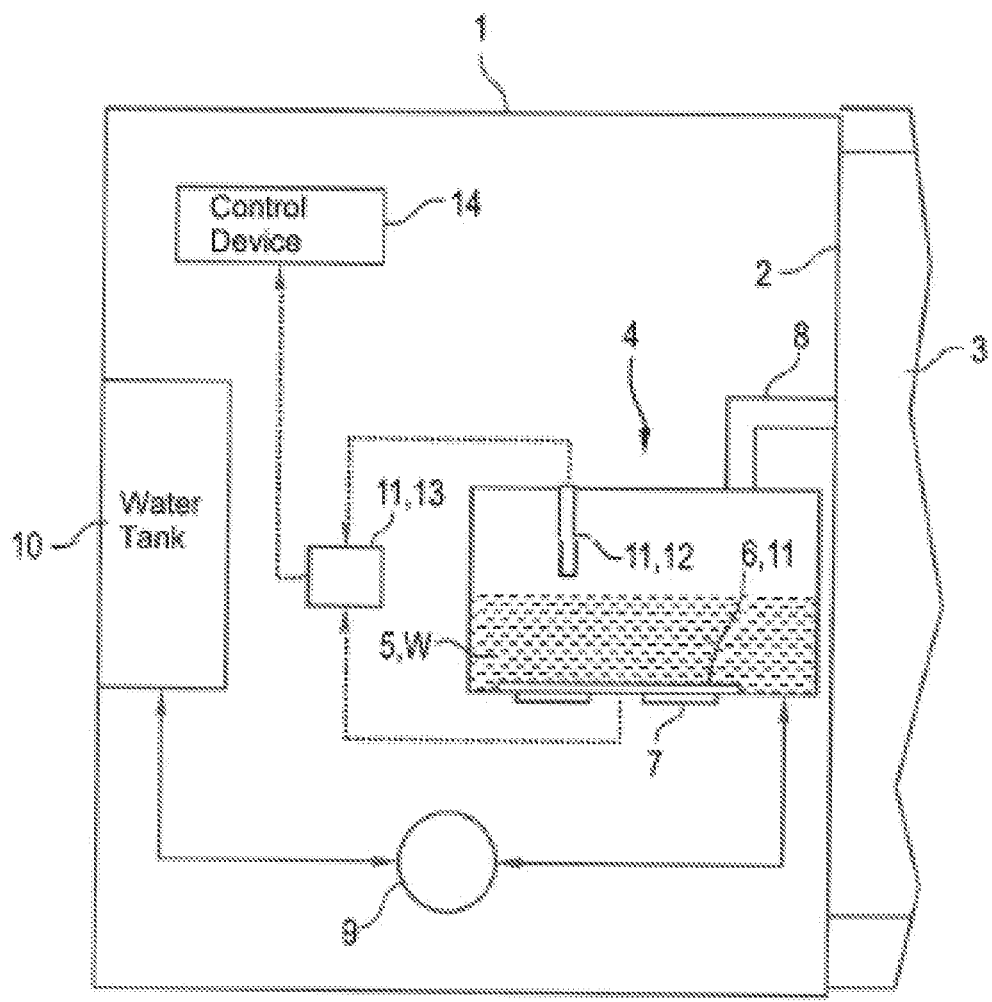
FIG. 1 shows a sectional representation in a side view of a sketch of a household steam treatment appliance.

FIG. 1 shows as a sectional representation in a side view a sketch of a household steam treatment appliance in the form of a baking oven 1 with steam treatment function. The baking oven 1 has a cooking chamber 3 delimited by an cooking chamber wall 2. An evaporator 4 with a water holding chamber 5 is present outside of the cooking chamber 3. On the bottom of the water holding chamber 5 is a metal plate 6 which can be heated by means of an electric heater 7. By means of the metal plate 6 the water W in the water holding chamber 5 can be heated, in particular to boiling point. The resulting steam reaches the cooking chamber 3 via a steam feed 8.

The water W can be introduced into the bottom of the water holding chamber 5 by means of a pump 9, namely from e.g. a removable water tank 10. The capacity of the water tank 10 is typically many times greater than the capacity of the water holding chamber 5. The pump 9 can also be operated in such a way that by means of this water W from the water holding chamber 5 can be pumped back into the water tank 10.

The evaporator 4 also has a fill level sensor 11 or a fill level sensor 11 is associated with the evaporator 4. The fill level sensor 11 has the metal plate 6 as a bottom measurement electrode and a top measurement electrode 12 protruding from above into the water holding chamber, the two of which are connected by an evaluation circuit 13. A voltage is applied to the metal plate 6 and the top measurement electrode 12. The evaluation circuit 13 is connected to a control device 14, which can also control the operation of the pump 10 and the heater 7. In one variant, the evaluation circuit 13 can be integrated into the control device 14, so that the control device 14 takes on the function of the evaluation circuit.

When introducing the water W into the water holding chamber 5 the metal plate 6 is first covered with water W. As the fill level increases the water W also comes into contact with the top measurement electrode 12, whereby the current flowing between the measurement electrodes 6, 12 rapidly increases. If the evaporator 4 is dry, usually no or very small parasitic leakage currents occur through damp inner walls of the evaporator 4. However, if the evaporator 4 is damp, e.g. due to steam generation being in progress, these leakage currents can be noticeably high. To prevent the leakage currents having an impact, in the evaluation circuit 13 a water detection measured value is therefore advantageously set or specified, that is greater than zero and greater than a measured value generated based on the leakage currents, but smaller than a measured value generated based on contact by the water W introduced.

This works well until the water detection measured value matches the electrical conductivity of the water W introduced. However, if very soft water (e.g. with an electrical conductivity of less than 50 μS/cm) is introduced into the water tank 10, although the water detection measured value is based on hard water (e.g. with an electrical conductivity of 100 μS/cm or more), there may be occasions when the water detection measured value is reached only late or even not at all, although the top measurement electrode 12 is already noticeably immersed in the water W introduced.

Figure 2:
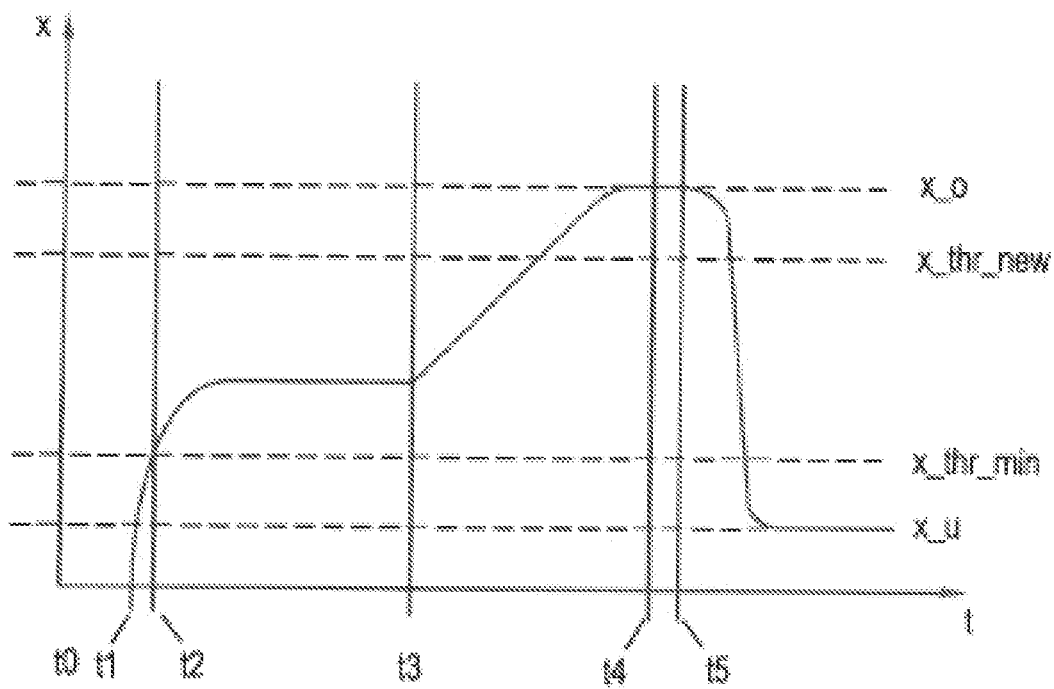
FIG. 2 shows the plotting of a measured value x sensed by a fill level sensor against time t for a possible adaptation process.

FIG. 2 shows the plotting of a measured value x (corresponding to a current flowing between the measurement electrodes 6 and 12) sensed by a fill level sensor 11 against the time t for a possible adaptation process.

Figure 3:
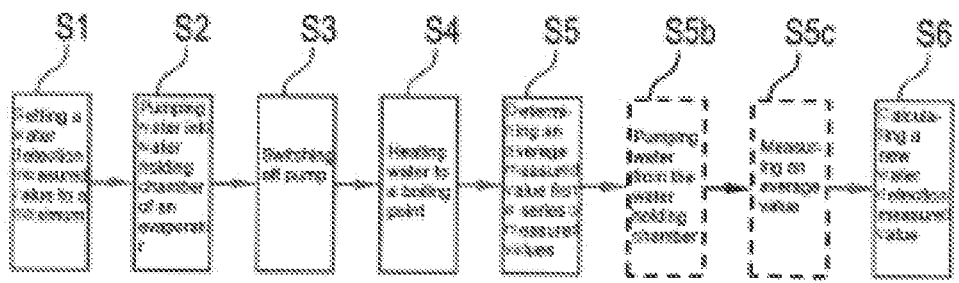
FIG. 3 shows the possible sequence of a method to adapt a water detection measured value.

First, as also described in more detail in FIG. 3, in a step S1 a water detection measured value x_thr is first set at its minimum value x_thr_min. The minimum value x_thr_min is e.g. selected such that direct contact with the measurement electrodes 6, 12 by water W with an electrical conductivity of between 1 μS/cm and 50 μS/cm can be reliably detected.

In a step S2, from instant t0 via the pump 9, cold water W is pumped from the water tank 10 into the water holding chamber 5, wherein from an instant t1 the presence of water W between the measurement electrodes 6, 12 results in a rapid increase in the measured values x.

The pump 9 is operated until the measured values x sensed by the fill level sensor 11 at an instant t2 reach or exceed the minimum value x_thr_min, and in a step S3 is then switched off. Due to a short after-run by the pump 9 even after achieving the minimum value x_thr_min water W is still pumped in, whereby the measured value x continues to increase slightly. The after-run can also be precisely set.

Steps S1 to S3 are preferably carried out with a dry evaporator 4, as in this way leakage currents via e.g. wet or possibly limescale-covered inner walls are avoided.

In a step S4 from an instant t3 the water W is brought to boiling point by switching on the heater 7, whereby the electrical conductivity of the water W and thus also the measured values x increase at least approximately in proportion.

At an instant t4 (e.g. 45 s after instant t3) the water W has reliably reached its boiling point, and the heater 7 is switched off.

In a step S5 within a measuring period from t4 to t5 of e.g. 5 s to 10 s, a series of individual measured values x is now measured and an average measured value x_o determined from these.

Next, in a step S6, at least on the basis of the average measured value x_o determined in step S5, a new water detection measured value x_thr=x_thr_new is calculated and set in the evaluation circuit 13.

In one variant, the water detection measured value x_thr_new can be calculated using a characteristic curve or a formula.

In another variant, in a step S5b, after determining the average measured value x_o (which can then also be referred to as the upper measured value) water W is pumped from the water holding chamber 5, until a lower value x=A·x_o is fallen below, whereby the fraction A can assume e.g. a value in the range [0.1; 0.5], e.g. 0.2.

Next, in a step S5c, similarly to the average measured value x_o, an average value x_u (which can also be referred to as the lower measured value) is measured. The average value x_u can correspond in particular to a leakage current.

In step S6 the new or adapted water detection measured value x_thr_new is set to a value between x_u and x_o.

The adaptation process is thereby ended.

In a subsequent steam generation operation water W is again pumped into the evaporator 4 until the measured values x of the fill level sensor 11 reach or exceed the water detection measured value x_thr_new. The heater 7 is then switched on in order to bring the water W to boiling point, whereupon evaporated water W reaches the cooking chamber 3 through the steam feed 8. If the measured value x of the fill level sensor 11 drops below the water detection measured value x_thr_new, when the heater 7 is switched on, water W is pumped back until the water detection measured value x_thr_new is again reached or exceeded, and so on.

Should, during the steam generation operation, the water detection measured value x_thr be set to a value intended for hard water, it may be the case that if very soft water W is used, the measured value x of the fill level sensor 11 would never reach the water detection measured value x_thr. Then e.g. a pump timeout error may be signaled and the evaporator 4 switched off.

Of course, the present invention is not limited to the exemplary embodiment shown.

Thus, by evaluating the measured value x of the fill level sensor 11 it is also possible to establish whether a descaling agent is present in the water W.

In general "a", "an" etc. can be understood as singular or plural, in particular in the sense of "at least one" or "one or more", etc., provided this is not explicitly excluded, for example by the expression "precisely one" etc.

Also, a number can include exactly the specified number as well as a usual tolerance range, provided this is not explicitly excluded.

The invention claimed is:

1. A method for operating a household steam treatment appliance including an evaporator with a heatable water holding chamber and a fill level sensor with at least two measurement electrodes, which are disposed over one another at a distance from each other in the heatable water holding chamber, said method comprising:
   adapting in an adaptation process a water detection measured value provided for indicating wetting of the at least two measurement electrodes with water introduced into the water holding chamber to an electrical conductivity of the water in the water holding chamber, wherein the adaptation process comprises the steps of:
   (a) setting the water detection measured value at a predetermined minimum value, (b) filling the water holding chamber with water, until a minimum value is reached or exceeded, (c) heating the water in the water holding chamber to a boiling point;

(d) determining by the fill level sensor a measured value corresponding to a current flowing between the at least two measurement electrodes, and (e) adapting the water detection measured value using the measured value.

2. The method of claim 1, wherein the water holding chamber is filled with water, when the evaporator is dry.

3. The method of claim 1, wherein the water detection measured value is adapted via a formula or a characteristic curve, which provides a link between the measured value determined by the fill level sensor and the water detection measured value.

4. The method of claim 1, wherein the water detection measured value is set at a first, higher value, when the measured value determined by the fill level sensor exceeds a predetermined threshold, or otherwise at a second, lower value.

5. The method of claim 1, wherein, after the fill level sensor has determined the measured value in step (d), the adaptation process comprises the steps of:

(d2) removing water from the water holding chamber, until the fill level sensor determines that the measured value has fallen below a predetermined fraction of the measured value, and (d3) subsequently determining by the fill level sensor a further measured value, wherein the water detection measured value is adapted in step (e) by using a value between the measured value measured in step (d) and the further measured value measured in step (d3).

6. The method of claim 1, wherein a presence of a descaling agent is established when the measured value determined in step (d) exceeds a predetermined threshold.

7. The method of claim 6, further comprising:

determining the predetermined threshold during a separate descaling process; and rinsing the water holding chamber, when the presence of the descaling agent is established.

8. A household steam-treatment appliance, comprising:

an evaporator including a heatable water holding chamber;

a fill level sensor including two measurement electrodes, which are disposed over one another at a distance from each other in the water holding chamber; and a control device configured to enable the household steam treatment appliance to carry out a method as set forth in claim 1.

9. The household steam-treatment appliance of claim 8, embodied as a steam cooking appliance.

10. The household steam-treatment appliance of claim 8, wherein the control device is configured to enable the household steam treatment appliance to fill water in the water holding chamber, when the evaporator is dry.

11. The household steam-treatment appliance of claim 8, wherein the water detection measured value is adapted via a formula or a characteristic curve, which provides a link between the measured value determined by the fill level sensor and the water detection measured value.

12. The household steam-treatment appliance of claim 11, wherein the water detection measured value is set at a first, higher value, when the measured value determined by the fill level sensor exceeds a predetermined threshold, or otherwise at a second, lower value.

13. The household steam-treatment appliance of claim 8, wherein, after the fill level sensor has determined the measured value, the control unit is configured to enable the household steam-treatment appliance to carry out the steps of:

(d2) removing water from the water holding chamber, until the fill level sensor determines that the measured value has fallen below a predetermined fraction of the measured value, and (d3) subsequently determining by the fill level sensor a further measured value, wherein the water detection measured value is adapted in step (e) by using a value between the measured value measured in step (d) and the further measured value measured in step (d3).

14. The household steam-treatment appliance of claim 8, wherein a presence of a descaling agent is established when the measured value determined in step (d) exceeds a predetermined threshold.

15. The household steam-treatment appliance of claim 14, wherein the predetermined threshold is determined during a separate descaling process and the water holding chamber is rinsed, when the presence of the descaling agent is established.

\* \* \* \* \*